3,358,012
3-ISOPROPYL-4-METHYLMERCAPTOPHENYL N-METHYLCARBAMATE
Everett E. Gilbert, Morris Township, Morris County, and Julian A. Otto, Stockholm, N.J., assignors to Allied Chemical Corporation, New York, N.Y., a corporation of New York
No Drawing. Filed Feb. 16, 1962, Ser. No. 174,368
1 Claim. (Cl. 260—479)

This invention relates to the production of new chemical compounds and more particularly to alkylmercaptophenyl N-methylcarbamates useful as active pesticidal toxicants.

Accordingly, one object of the present invention is to provide new chemical compounds in the form of alkylmercaptophenyl N-methylcarbamates. Another object of the invention is the provision of new alkylmercaptophenyl N-methylcarbamates for application as pesticides. Other objects and advantages of the invention will appear hereinafter.

The alkylmercaptophenyl N-methylcarbamates of this invention may be represented by the following formula:

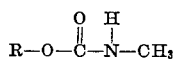

wherein R represents an alkylmercaptophenyl group, preferably an alkylmercaptophenyl group in which the alkyl substituent contains one to five carbon atoms.

The alkylmercaptophenyl N-methylcarbamates may be prepared by reacting an alkylmercaptophenol and methyl isocyanate in accordance with the methods described in Agricultural and Food Chemistry, volume 2 (1954), page 865 and Journal of Economic Entomology, volume 53 (1960), page 828. The reaction is represented by the following equation:

wherein R is as defined above.

The methyl isocyanate is preferably employed in at least equimolecular amount with respect to the alkylmercaptophenol. The reaction may be carried out at temperature of about 25° to 150° C. for a period of about 3 hours to several days. Atmospheric or superatmospheric pressure may be used. If desired, the reaction may be conducted in the presence of an anhydrous solvent such as isopropyl ether, ethyl ether or acetone. The reaction may be aided by addition of about 0.5 to 1% by weight (based on the alkylmercaptophenol) of a tertiary amine catalyst such as triethylamine.

The alkylmercaptophenols which are employed as starting materials for producing the alkylmercaptophenyl N-methylcarbamates are preferably 2- and 4-alkylmercaptophenols. These alkylmercaptophenols may be prepared by reacting phenolic compounds containing at least one free 2- or 4-position and dialkyl disulfides in the presence of a sulfonic acid catalyst, as described in Gilbert et al. copending application Ser. No. 169,647, filed Jan. 29, 1962. The 4-alkylmercaptophenols obtained by reacting phenolic compounds containing a free 4-position and dialkyl disulfides produce alkylmercaptophenyl N-methylcarbamates having particularly outstanding pesticidal activity.

The phenolic compounds used in making the alkylmercaptophenol starting materials may be selected from the group consisting of phenol and alkyl-substituted, aryl-substituted, halo-substituted and alkoxy-substituted phenols. Representative of these compounds are phenol, 3-methylphenol (3-cresol), 3-ethylphenol, 3-isopropylphenol, 3-tert.-butylphenol, 3,5-dimethylphenol, 3-methyl-6-isopropylphenol, 3,5-diisopropylphenol, 2-methyl-5-isopropylphenol, 2,6-di-tert.-butylphenol, 2,6-diisopropylphenol, 2-phenylphenol, 3-chlorophenol, 3-methoxyphenol, 4-methylphenol (4-cresol), 4-methoxyphenol and 4-chlorophenol.

The dialkyl disulfides used in making the alkylmercaptophenol starting materials preferably contain alkyl groups having 1 to 5 carbon atoms. Typical of these sulfides are dimethyl disulfide, diethyl disulfide, di-n-butyl disulfide, di-i-butyl disulfide, di-n-amyl disulfide, di-i-amyl disulfide and di(chloromethyl) disulfide.

Typical of the alkylmercaptophenol starting materials are 4-methylmercaptophenol, 3-methyl-4-methylmercaptophenol, 3-ethyl-4-methylmercaptophenol, 3-isopropyl-4-methylmercaptophenol, 2-isopropyl-4-methylmercapto-5-methylphenol, 3,5 - diisopropyl-4-methylmercaptophenol, 2-methyl-4-methylmercapto-5-isopropylphenol, 3,5 - dimethyl - 4 - methylmercaptophenol, 2-phenyl-4-methylmercaptophenol, 4-ethylmercaptophenol, 2-ethylmercaptophenol and 3-methoxy-4-methylmercaptophenol.

The alkylmercaptophenyl N-methylcarbamates of this invention are insoluble in water but soluble in organic solvents such as acetone, isopropyl ether, benzene and other aromatic solvents.

The following examples, in which parts are by weight, are given for the purpose of illustrating methods of producing the aklylmercaptophenyl N-methylcarbamates.

*Example 1*

42 parts of 4-methylmercaptophenol and 18 parts of methyl isocyanate were heated at reflux in a reaction vessel. The pot temperature rose slowly as the reaction proceeded. After about 21½ hours the pot temperature was about 140° C. with no appreciable reflux. The heating was continued for about another hour at 120–140° C. A yield of 57 parts of 4-methylmercaptophenyl N-methylcarbamate (Compound 1) was obtained.

4-methylmercaptophenyl N-methylcarbamate produced by the reaction of 4-methylmercaptophenol and methyl isocyanate was recrystallized from hexane. The purified material exhibited a melting point of 86° C. Infrared spectrographic analysis of the purified product showed the presence of the N-methylcarbamate group by peaks at 2.70 and 5.88 microns.

Elemental analysis of the product gave the following results: Calculated, percent N, 7.1; S, 16.2. Found, percent N, 6.3; S, 15.4.

*Example 2*

15.4 parts of 3-methyl-4-methylmercaptophenol and 6 parts of methyl isocyanate were dissolved in 12 parts of isopropyl ether and allowed to stand for several days in a glass stoppered flask at room temperature. The reaction mixture was then cooled in Dry Ice. Petroleum ether was added, and a tacky solid separated. After cooling, the tacky solid comprising 3-methyl-4-methylmercaptophenyl N-methylcarbamate (Compound 2) was filtered off and washed with petroleum ether. The product constituted 20.3 parts.

A fraction of the product was recrystallized from hexane. Infrared spectrographic analysis showed peaks at 2.70 and 5.88 microns, indicating the presence of the N-methylcarbamate group.

Elemental analysis of the product gave the following results: Calculated, percent N, 6.6; S, 15.1. Found percent N, 6.2; S, 14.2.

*Example 3*

25.2 parts of 3-ethyl-4-methylmercaptophenol and 9 parts of methyl isocyanate were dissolved in 12 parts of isopropyl ether and allowed to stand in a glass stoppered flask at room temperature for about three days. 35 parts of petroleum ether were added to the reaction mixture, and a liquid layer separated. The layer was cooled in Dry Ice and became very viscous. Supernatant liquid was decanted, and the residue was washed with petroleum ether. Residual solvent was removed from the residue on a steam bath. 30.5 parts of product comprising 3-ethyl-4-methylcercaptophenyl N-methylcarbamate (Compound 3) were obtained.

*Example 4*

27.3 parts of 3-isopropyl-4-methylmercaptophenol and 9 parts of methyl isocyanate were dissolved in 22 parts of isopropyl ether and treated as described in Example 3. 32.5 parts of product comprising 3-isopropyl-4-methylmercaptophenyl N-methylcarbamate (Compound 4) were obtained.

*Example 5*

19.6 parts of 2-isopropyl-4-methylmercapto-5-methylmethylphenol and 6 parts of methyl isocyanate were dissolved in 12 parts of isopropyl ether and heated at reflux for twenty-four hours. Upon evaporation of the resulting reaction mass, a residue of 26 parts comprising 2-isopropyl - 4 - methylmercapto - 5 - methylphenyl N-methylcarbamate (Compound 5) were obtained.

*Example 6*

16 parts of 3,5-diisopropyl-4-methylmercaptophenol and 4 parts of methyl isocyanate were dissolved in 13 parts of isopropyl ether and allowed to stand in a glass stoppered flask at room temperature for two days. 8 parts of solid comprising 3,5-diisopropyl-4-methylmercaptophenyl N-methylcarbamate (Compound 6) were obtained.

*Example 7*

20 parts of 2-methyl-4-methylmercapto-5-isopropylphenol and 6 parts of methyl isocyanate were dissolved in 16 parts of isopropyl ether and heated at reflux for about 6–7 hours. The ether was evaporated, and the reaction mass was placed in a pressure bottle with 6 parts of methyl isocyanate and a few drops of triethylamine (as catalyst). The bottle was heated on a steam bath for about 5 hours. 27 parts of a very viscous oil comprising 2-methyl-4-methylmercapto - 5 - isopropylphenyl N-methylcarbamate (Compound 7) were obtained.

*Example 8*

25.2 parts of 3,5-dimethyl-4-methylmercaptophenol and 9 parts of methyl isocyanate were dissolved in 20 parts of isopropyl ether and heated at reflux for about 6–7 hours. The ether was evaporated, and 29 parts of residue comprising 3,5 - dimethyl - 4 - methylmercaptophenyl N-methylcarbamate (Compound 8) were obtained.

*Example 9*

21.6 parts of 2-phenyl-4-methylmercaptophenol and 6 parts of methyl isocyanate treated as described in Example 8 gave 25 parts of a viscous oil comprising 2-phenyl - 4 - methylmercaptophenyl N - methylcarbamate (Compound 9).

*Example 10*

23.1 parts of 4-ethylmercaptophenol and 9 parts of methyl isocyanate were dissolved in 18 parts of isopropyl alcohol and heated at reflux. The ether was evaporated, and the reaction mass was placed in a pressure bottle with 5 parts of methyl isocyanate and a few drops of triethylamine. The bottle was heated for about 5 hours on a steam bath. 32 parts of residue comprising 4-ethylmercaptophenyl N-methylcarbamate (Compound 10) were obtained.

*Example 11*

12 parts of 2-ethylmercaptophenol, 4.5 parts of methyl isocyanate and a few drops of triethylamine were placed in a pressure bottle which was heated for about five hours on a steam bath. On cooling, 16 parts of a solid comprising 2-ethylmercaptophenyl N-methylcarbamate (Compound 11) were obtained.

*Example 12*

23.5 parts of 3-methoxy-4-methylmercaptophenol and 8 parts of methyl isocyanate were treated as described in Example 11 to give 31 parts of a viscous oil comprising 3-methoxy-4-methylmercaptophenyl N-methylcarbamate (Compound 12).

The alkylmercaptophenyl N-methylcarbamates of this invention are active toxicants for combatting insects and mites. Of the alkylmercaptophenyl N-methylcarbamates, 3-isopropyl-4-methylmercaptophenyl N-methylcarbamate (Compound 4) has been found to have unexpectedly superior insecticidal and miticidal activity.

The toxicants are ordinarily applied in conjunction with a carrier which may be a solid, liquid or gaseous material.

When employed in the form of powders or dusts for killing insects and mites, the toxicants may be mixed with a substantial proportion of any suitable inert material or diluent, preferably in finely divided form, such as known grades of prepared parasiticide carrier clays, pyrophyllite, Fuller's earth, bentonite, sulfur, lime, talc, whiting, diatomaceous earth, etc. Suitable dusts of this type usually contain not less than 1%, and preferably not less than 5%, by weight of toxicant.

Liquid insecticide or miticide sprays containing the toxicants may be prepared by first forming a solution of the N-methylcarbamate in a suitable organic solvent, e.g. xylene or a high aromatic coal tar or petroleum solvent, and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water so-called dry wettable spray powders or water-dispersible pastes containing the N-methylcarbamates of the invention. These mixtures may also include inert diluents, suitable quantities of wetting, dispersing and suspending agents and, if desired, secondary toxicants.

The aqueous spray dispersions preferably should contain the toxicant in an amount not less than $\frac{1}{16}$ pound per 100 gallons of spray, the more usual concentrations being in the range of ½ to 2 pounds per 100 gallons of spray.

Following Table I shows the results of tests relating to application to insects and mites of the N-methylcarbamates of the present invention.

TABLE I

| Compound | Formulation (parts by volume) | Percent Kill | | | | |
|---|---|---|---|---|---|---|
| | | Two-spotted Mites | Pea Aphids | Bean Beetle Larvae | Southern Army worms | Houseflies |
| 1 | 1 part N-methyl-carbamate composition [1] per 19 parts water.[2] | 100 | 100 | 100 | 60 | 100 |
| 2 | ----do---- | 100 | 100 | 100 | 100 | 100 |
| 3 | ----do---- | 100 | 100 | 100 | | 100 |
| 4 | ----do---- | 100 | 100 | 100 | 80 | 100 |
| 5 | ----do---- | | 100 | 100 | | |
| 6 | ----do---- | | 70 | 100 | | 80 |
| 7 | ----do---- | 98 | 100 | 100 | | |
| 8 | ----do---- | 100 | 100 | 100 | 100 | 90 |
| 9 | ----do---- | | | 80 | | |
| 10 | ----do---- | 87 | 100 | 100 | 100 | 95 |
| 11 | ----do---- | 98 | 100 | 100 | 100 | 98 |
| 12 | ----do---- | | | 100 | | 92 |

[1] 4.8 grams of N-methylcarbamate dissolved in acetone to 100 cc.
[2] 19 parts of a sugar solution (20 pounds of sugar dissolved in water to 100 gallons) were used in the housefly tests.

The tests on toxicity to two-spotted mites (*Tetranychus bimaculatus*) were run by spraying the indicated formulation onto horticultural (cranberry) bean plants infested with the mites. Following treatment, the plants were stored on racks in irrigated trays under greenhouse conditions. Mortality counts were made three days after treatment.

The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made three days after treatment.

The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of kill was made three days after treatment.

The tests on toxicity to southern armyworms (*Prodenia eridania*) were run by spraying horticultural (cranberry) bean plants with the indicated formulation and allowing the plants to dry. Armyworm larvae were confined to the treated foliage by means of wire cages. Mortality count was made three days after treatment.

The tests on toxicity to houseflies (*Musca domestica*) were run by spraying the indicated formulation onto glass plates and allowing them to dry. The flies were confined over the plates by means of screen wire hemispheres, moisture and food being provided in the form of balls of "Cellucotton" (an absorbent cellulose composition resembling cotton) soaked in water-sugar solution. Percent kill was recorded twenty-four hours after confinement.

Following Table 2 shows the results of tests on male and female German cockroaches (*Blattella germanica*) comparing Compounds 1 and 2 to the commercial 1-naphthyl N-methylcarbamate ("Sevin"). The data were obtained by coating the lower two-thirds of a one-half pint milk bottle with a formulation comprising 4.8 grams of toxicant dissolved in acetone to 100 cc. and then allowing the acetone to evaporate before adding the roaches. Kill was observed twenty-four hours after treatment.

TABLE 2

| Compound | 24.0 mgs. Toxicant/Bottle | | 2.4 mgs. Toxicant/Bottle Female | 0.24 mg. Toxicant/Bottle Female |
|---|---|---|---|---|
| | Male | Female | | |
| 1 | 100 | 100 | 100 | 70 |
| 2 | 100 | 100 | 100 | 70 |
| "Sevin" | 10 | 0 | | |

In tests on houseflies using the method described in connection with Table I, the following results were obtained comparing Compounds 1 and 2 to "Sevin":

TABLE 3

| Compound | Formulation (parts by vol.) | Non-resistant Flies Percent Kill | Resistant Flies Percent Kill |
|---|---|---|---|
| 1 | 1 part N-methylcarbamate composition [1] per 19 parts sugar solution.[2] | 100 | 75 |
| 2 | ----do---- | 100 | 63 |
| "Sevin" | ----do---- | 7 | 0 |

[1] 4.8 grams of N-methylcarbamate dissolved in acetone to 100 cc.
[2] 20 pounds of sugar dissolved in water to 100 gallons.

In tests on two-spotted mites comparing Compounds 3 and 4 to "Sevin" using the method described in connection with Table I, the following results were obtained:

TABLE 4

| Compound | Formulation | Percent Kill |
|---|---|---|
| 3 | 1 part N-methylcarbamate composition [1] per 79 parts water. | 100 |
| 3 | 1 part N-methylcarbamate composition [1] per 319 parts water. | 100 |
| 3 | 1 part N-methylcarbamate composition [1] per 639 parts water. | 19.3 |
| 4 | 1 part N-methylcarbamate composition [1] per 79 parts water. | 100 |
| 4 | 1 part N-methylcarbamate composition [1] per 319 parts water. | 100 |
| 4 | 1 part N-methylcarbamate composition [2] per 639 parts water. | 86.5 |
| "Sevin" | 2 parts N-methylcarbamate composition [2] per 78 parts water. | 5 |
| Do | 2 parts N-methylcarbamate composition [2] per 318 parts water. | 7 |

[1] 4.8 grams of N-methylcarbamate dissolved in acetone to 100 cc.
[2] 2.4 grams of N-methylcarbamate dissolved in acetone to 100 cc.

Following Table 5 shows the results of tests on plum curculios (*Contrachelus nenuphar*) comparing Compounds 3 and 4 to "Sevin." The data were obtained by spraying the indicated formulation onto small green apples and allowing the apples to dry. The curculios were confined over the apples, and percent kill was recorded at predetermined intervals after confinement.

TABLE 5

| Compound | Formulation | Percent Kill | |
|---|---|---|---|
| | | 4 days | 7 days |
| 3 | 1 part N-methylcarbamate composition [1] per 79 parts water. | 40 | 60 |
| 4 | ----do---- | 80 | 90 |
| "Sevin" | 2 parts N-methylcarbamate composition [2] per 78 parts water. | 10 | 10 |

[1] 4.8 grams of N-methylcarbamate dissolved in acetone to 100 cc.
[2] 2.4 grams of N-methylcarbamate dissolved in acetone to 100 cc.

As shown by the above data, the N-methylcarbamates of the present invention show unexpectedly increased insecticidal and miticidal activity as compared to the commercial N - methylcarbamate "Sevin." Further, the data show the particularly outstanding toxic activity of 3-isopropyl-4-methylmercaptophenyl N-methylcarbamate (Compound 4).

While the preferred embodiments for carrying out the invention have been described, it will be apparent that many changes may be made therein without departing from the spirit of the invention.

We claim:

3-isopropyl-4-methylmercaptophenyl N - methylcarbamate.

References Cited

UNITED STATES PATENTS 2,776,197   1/1957   Gysin et al. _____ 260—479

OTHER REFERENCES

Kolbezen et al.: Journal of Agricultural and Food Chemistry, volume 2, pages 864–870 (1954), (photocopy in 260–479C).

LORRAINE A. WEINBERGER, *Primary Examiner.*

I. R. PELLMAN, *Assistant Examiner.*